US006599197B2

(12) United States Patent
Tatsuno

(10) Patent No.: US 6,599,197 B2
(45) Date of Patent: Jul. 29, 2003

(54) IMPULSE TORQUE GENERATOR FOR A HYDRAULIC POWER WRENCH

(75) Inventor: Koji Tatsuno, Osaka (JP)

(73) Assignee: Uryu Seisaku Ltd., Osaka (JP)

( * ) Notice: Subject to any disclaimer, the term of this patent is extended or adjusted under 35 U.S.C. 154(b) by 0 days.

(21) Appl. No.: 09/925,607

(22) Filed: Aug. 10, 2001

(65) Prior Publication Data

US 2002/0022524 A1 Feb. 21, 2002

(30) Foreign Application Priority Data

Aug. 11, 2000 (JP) ....................................... 2000-243625

(51) Int. Cl.[7] ............................ F16D 3/80; F16D 31/00

(52) U.S. Cl. ............................ 464/25; 464/26; 173/93; 173/93.5

(58) Field of Search ....................... 464/25, 26; 173/93, 173/93.5, 93.6

(56) References Cited

U.S. PATENT DOCUMENTS 4,920,836 A * 5/1990 Sugimoto et al. .......... 173/93.5
5,611,404 A * 3/1997 Biek et al. ..................... 173/1

FOREIGN PATENT DOCUMENTS

GB 2231292 A * 11/1990

* cited by examiner

*Primary Examiner*—Lynne H. Browne
*Assistant Examiner*—Aaron Dunwoody
(74) *Attorney, Agent, or Firm*—Wenderoth, Lind & Ponack, L.L.P.

(57) ABSTRACT

An impulse torque generator for a hydraulic torque wrench is durable, compact in size and capable of stably generating a large impulse torque while eliminating a blade being inserted in the main shaft. A main shaft has a cam thereon positioned to be slidable in an axial direction without turning against the main shaft. Oil guide holes pass in an axial direction inside the cam. A cylinder receives the base end of the main shaft and the cam, and forms oil chambers to be filled with an operating fluid across the cam. Pins are inserted in the cam groove of the cam, provided projecting from the inner circumferential face of the cylinder. A drive shaft is to be connected to a drive source which rotatively drives the cylinder. A check valve shuts off the circulation of operating fluid between the oil chambers formed across the cam by selectively closing the oil guide holes formed in the cam, depending on the relative rotating angle between the cam and the cylinder.

9 Claims, 7 Drawing Sheets

IMPULSE TORQUE GENERATOR FOR A HYDRAULIC POWER WRENCH

BACKGROUND OF THE INVENTION

The present invention relates to an impulse torque generator for a hydraulic torque wrench, more specifically an impulse torque generator for a hydraulic torque wrench which is highly durable, compact in size and capable of stably generating a large impulse torque.

Conventionally, hydraulic torque wrenches using A hydraulic impulse torque generator with little noise and few vibrations have been developed and put to practical use.

For example, FIG. 6 and FIG. 7 show an example of such hydraulic torque wrench. An impulse torque generator of a hydraulic torque wrench W is realized in a way so as to charge hydraulic oil in a liner chamber La formed in a liner L. A blade insertion groove is provided in a main shaft S inserted coaxially with the liner L and a blade B is inserted in this blade insertion groove. The blade B is put in contact with an inner circumferential face of the liner chamber La by constantly urging it in the outer circumferential direction of the shaft with a spring. A sealed face is formed on the outer circumferential face of the shaft S and the inner circumferential face of the liner chamber La.

It is arranged so that, by turning the liner L with an air motor R, an impulse torque is produced on the main shaft S when the sealed face formed on the inner circumferential face of the liner chamber La, the sealed face formed on the outer circumferential face of the shaft S and the blade B agree with each other.

By the way, in the case of the conventional impulse torque generator for the hydraulic torque wrench W, a construction is adopted in which a blade insertion groove is provided on the shaft S, a blade B is inserted in this blade insertion groove, and this blade B is constantly urged in the outer circumferential direction of the shaft with a spring to be put in contact with the inner circumferential face of the liner L. For that reason, the tip of the blade B comes in sliding contact with the inner circumferential face of the liner L, readily causing wear of the material on both sides and thus presenting a problem in the durability of the system, including breakdown of the spring, etc.

Moreover, another problem was that, because of the necessity of providing a blade insertion groove and a hole in which to insert a spring in the main shaft S, it was necessary to have a large diameter of the main shaft S to maintain the strength of the shaft S, which further increases the size of the equipment itself and complicates the equipment structure.

Furthermore, still another problem was that there was a large energy loss because the operating fluid was liable to leak through the gap between members such as sliding portions, etc., in addition to the sliding resistance between the tip of the blade B and the inner circumferential face of the liner L. Yet another problem was that the temperature of the operating fluid rises with frictional heat produced by sliding, causing fluctuations in the strength of impact torque produced with changes in viscosity of the operating fluid.

SUMMARY OF THE INVENTION

In view of the problems of the conventional impulse torque generators for hydraulic torque wrenches, the objective of the present invention is to provide an impulse torque generator for a hydraulic torque wrench which is durable, compact in size and capable of stably generating a large impulse torque by eliminating the blade inserted into the main shaft, which was conventionally essential with this type of impulse torque generator for hydraulic torque wrenches.

To achieve the objective, the impulse torque generator for a hydraulic torque wrench according to the present invention has a main shaft, a cam inserted into the main shaft slidably in an axial direction without turning against the main shaft and forming oil guide holes passing inside it in an axial direction. A cylinder receives the base end of the main shaft and cam, forming oil chambers to be filled with an operating fluid across the cam. Pins are inserted into the cam groove of the cam and provided in a projecting manner on the inner circumferential face of the cylinder. A drive shaft to be connected to the drive source drives the cylinder in a rotating fashion. A check valve shuts off the circulation of the operating fluid between the oil chambers formed across the cam by selectively closing the oil guide holes formed in the cam depending on the relative rotating angle between the cam and cylinder.

This impulse torque generator for a hydraulic torque wrench can slide the cam, in which is inserted the pin, freely in the axial direction without turning against the main shaft, in a state in which the oil guide hole formed in the cam is open, by driving the cylinder with the drive shaft connected to the drive source in a rotating manner. In this state, no impulse torque is produced because there are no restrictions on the cylinder and the cam.

Moreover, as the cylinder is further driven to continue turning, the oil guide hole formed in the cam is closed by the check valve, depending on the relative rotating angle between the cam and cylinder, and the circulation of the operating fluid between the oil chambers formed across the cam is shut off. If, in this state, an attempt is made to slide the cam in the axial direction by further rotated driving of the cylinder, the pressure in the oil chamber placed in the direction in which the cam slides rises, and the pressure in the oil chamber located in the opposite direction drops.

At that time, the pins provided in projection on the inner circumferential face of the cylinder are put in strong contact with the side face on the high-pressure oil chamber side of the cam grooves formed on the outer circumferential face of the cam. Since the sliding of the cam is prevented by shutting off the circulation of the operating fluid between the oil chambers formed across the cam, a large frictional force is produced between the side face of the cam grooves and the pins, restricting the cylinder and the cam. This makes it possible to produce an impulse torque on the main shaft inserted into the cam by transmitting a rotational driving force from the cylinder to the cam through the pins.

Also, this impulse torque generator for a hydraulic torque wrench can improve the system's durability by eliminating the blade inserted in the main shaft, which was conventionally essential with this type of impulse torque generator for hydraulic torque wrenches, and also because of the absence of any other easily broken parts.

Moreover, since there is no need to provide any blade insertion groove or hole in which to insert the spring in the main shaft, it becomes possible to keep the diameter of the main shaft at the minimum required level and form the system itself in a compact size, and to also simplify the equipment structure, reducing the manufacturing costs of the system.

Furthermore, thanks to the small working resistance of the system and small leakage of operating fluid through the gap between members, there is only a small loss of energy.

Because of the reduced temperature increase of the operating fluid due to frictional heat, few fluctuations are produced in the magnitude of the impulse torque produced as a result of changes in the viscosity of the operating fluid. For those reasons, it becomes possible to stably produce a large impulse torque.

Therefore it is possible to form a plurality of cam grooves on the outer circumferential face of the cam and provide, in a projecting manner, a plurality of pins to be inserted in the respective cam grooves so as to have uniform angle intervals. This makes it possible to transmit a rotational driving force from the cylinder to the cam through the pin and produce a more stable impulse torque.

Furthermore, it is also possible for the check valve to close the oil guide hole formed in the cam each time when the cam and cylinder turn 360° so as to shut off the circulation of the operating fluid between the oil chambers formed across cam. This makes it possible to produce a large impulse torque by utilizing the inertia of the cylinder each time the cam and cylinder turn by 360°.

Further, it is possible to form, in the cylinder, an oil guide channel connected between the oil chambers and to provide an output adjusting mechanism for adjusting the magnitude of the impulse torque produced by limiting the flow rate of the operating fluid circulating through the oil guide channel. This makes it possible to easily control the magnitude of the impulse torque produced by limiting the flow rate of the operating fluid circulating through the oil guide channel formed in the cylinder and connecting between the oil chambers.

DETAILED DESCRIPTION OF THE INVENTION

An embodiment of an impulse torque generator for a hydraulic torque wrench according to the present invention will be explained below based on drawings.

FIG. 1 to FIG. 5 show an embodiment of the impulse torque generator for a hydraulic torque wrench according to the present invention.

Figure 6:
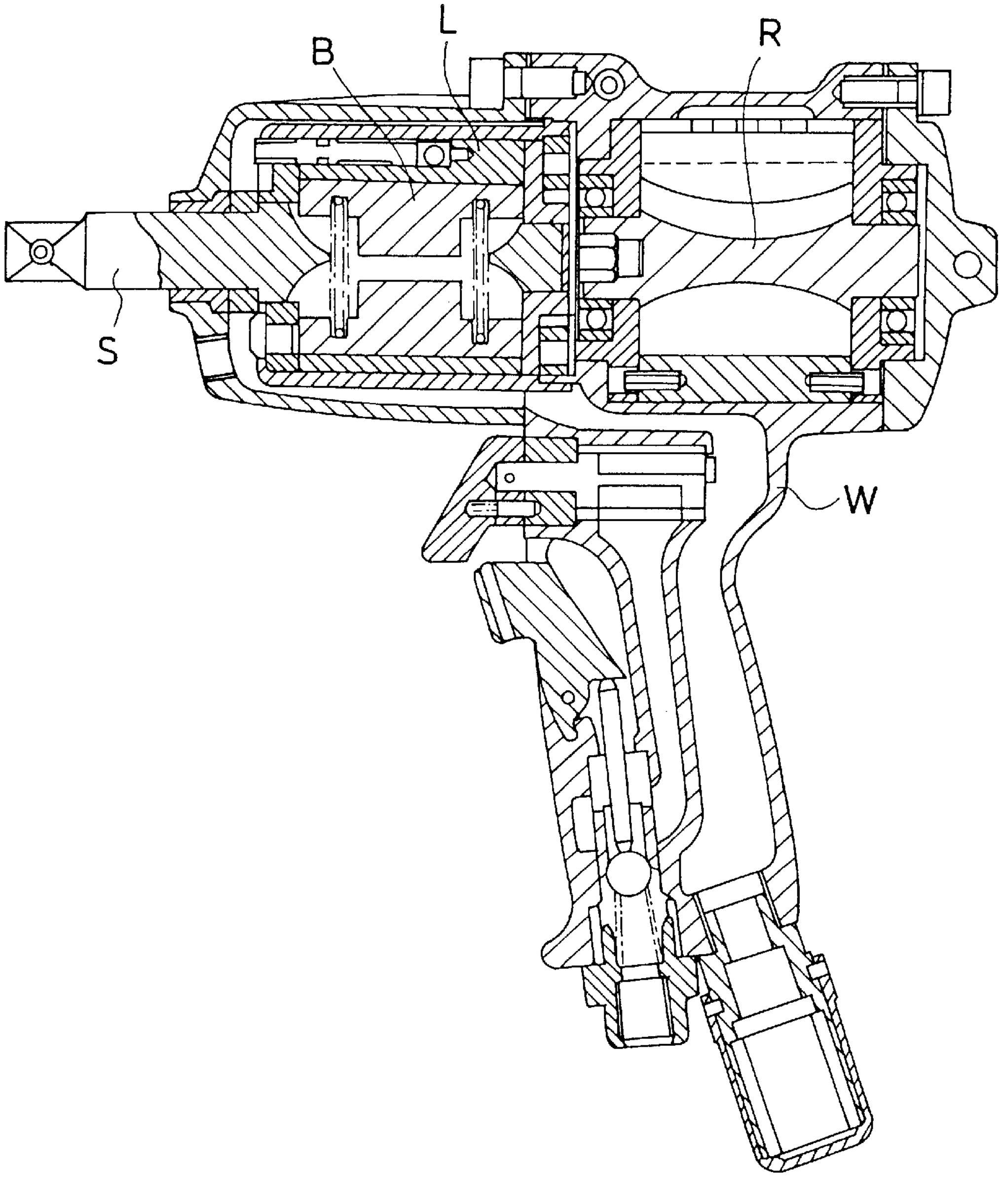
FIG. 6 PRIOR ART
FIG. 6 is a sectional front elevation showing a conventional impulse torque generator for a hydraulic torque wrench.
Figure 7:
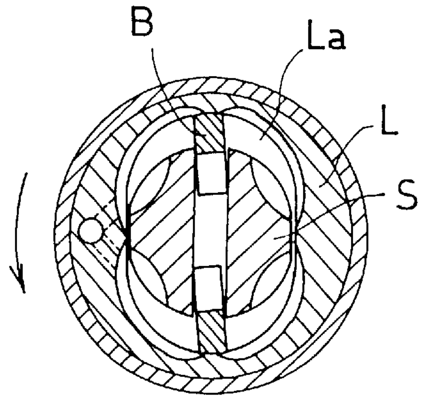
FIG. 7 (A) PRIOR ART
FIGS. 7(A)–7(D) are explanatory drawings showing actions of a conventional impulse torque generator for a hydraulic torque wrench.
Figure 7:
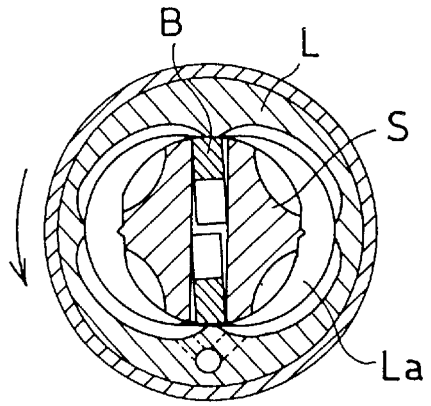
FIG. 7 (B) PRIOR ART
Figure 7:
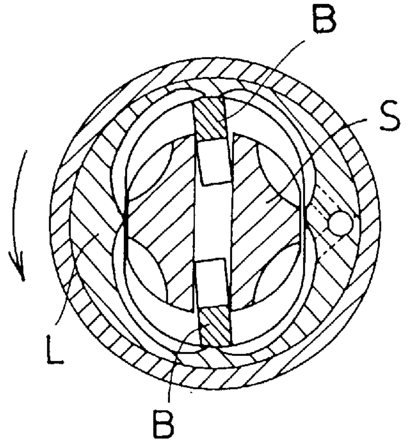
FIG. 7 (C) PRIOR ART
Figure 7:
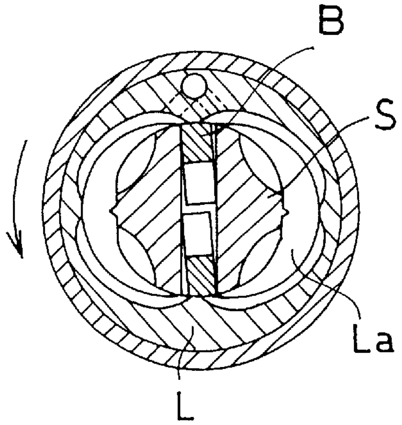
FIG. 7 (D) PRIOR ART

This impulse torque generator for a hydraulic torque wrench, which uses an air motor as a drive source in the same way as a conventional hydraulic torque wrench as indicated in FIG. 6 and FIG. 7, has a main shaft 3. A cam 4 is fit on this main shaft 3 to be slidable in an axial direction without turning against the main shaft 3. Cam 4 forms cam grooves 41*a*, 41*b* on an outer circumferential face and also forms oil guide holes 42*b*, 42*b*, passing in axial direction inside the cam 4. A cylinder C stores the base end of the main shaft 3 and the cam 4 and forms oil chambers A and B to be filled with an operating fluid across the cam 4. Pins 81 and 82 fit in the cam grooves 41*a* and 41*b* of the cam 4, the pins provided in projection on the inner circumferential face of the cylinder C. A drive shaft 23 is to be connected to a drive source (not illustrated) which rotatively drives the cylinder C. A check valve 5 shuts off the circulation of operating fluid between the oil chambers A and B formed across the cam 4 by selectively closing the oil guide holes 42*a* and 42*b* formed in the cam 4 depending on the relative rotating angle between the cam 4 and the cylinder C.

Figure 1:
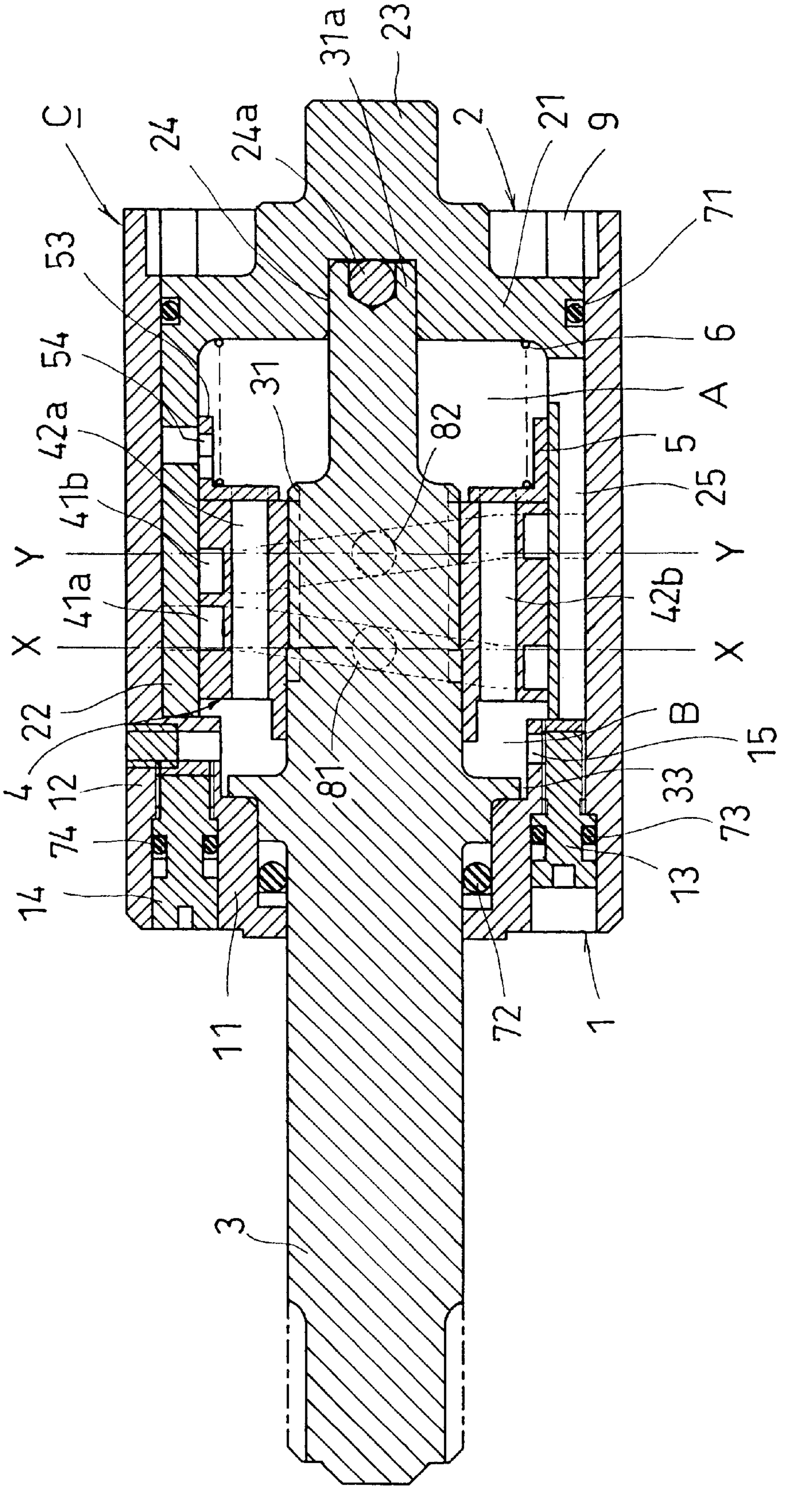
FIG. 1 is a sectional front elevation showing an embodiment of an impulse torque generator for a hydraulic torque wrench according to the present invention.

In this case, the cylinder C is composed, as shown in FIG. 1, of an outer casing 1 constituting an end face wall 11 and a cylinder unit 12 on one side, an inner casing 2 fit to this outer casing 1 and constituting an end face wall 21, a cylinder 22 and the drive shaft 23 on the other side, and a fixing member 9 for fixing the inner casing 2 to the outer casing 1 and integrating the two by screwing to the open end of the cylinder unit 12 of the outer casing 1.

Moreover, as shown in FIG. 1, the main shaft 3, the base end of which is to be stored in the cylinder C, supports a base end 31 a through a ball bearing 24*a* in a bearing hole 24 formed in the end face wall 21 of the inner casing 2. To fit the cam 4 on the main shaft 3 to be slidable in the axial direction without turning, the main shaft 3 forms a section of shaft 31 in this part with a polygonal shape or with the shape of a spline, etc. (a hexagonal shape in this embodiment), for example. At its tip side is a collar 33 for protection against the main shaft 3 falling out. The tip side extends by passing through the end face wall 11 of the outer casing 1.

Figure 2:
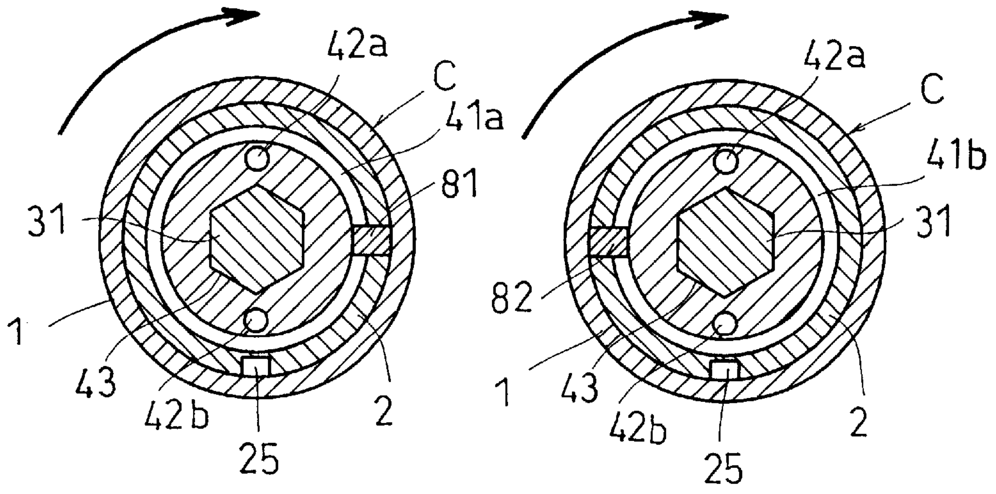
FIG. 2(A) is a sectional view taken on line X—X of FIG. 1.
FIG. 2(B) is a sectional view taken on line Y—Y of FIG. 1.
Figure 3:
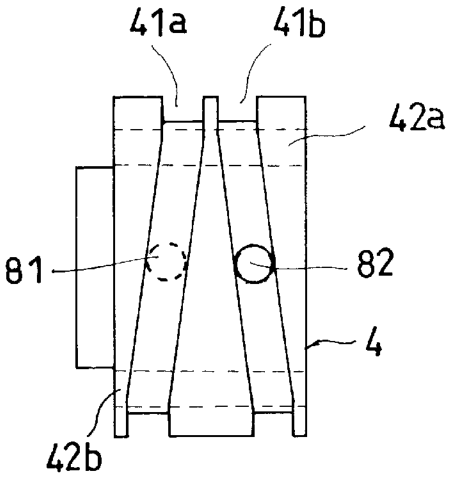
FIG. 3 show a cam, FIG. 3(A) being a front elevation and FIG. 3(B) a side view FIG. 4 show a check valve, FIG. 4(A) being a sectional front elevation and FIG. 4(B) a side view.
Figure 3:
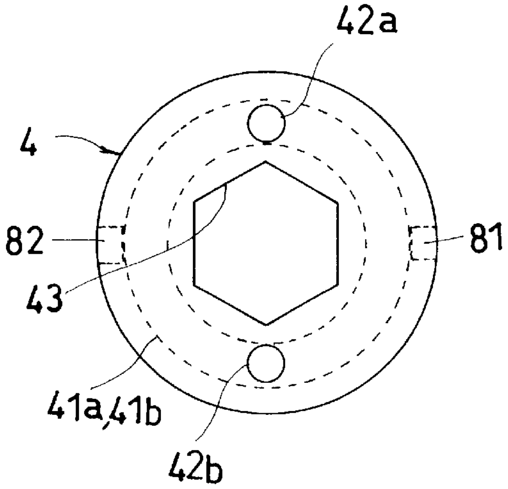

The cam 4, to be fit on the main shaft 3 to be slidable in the axial direction without turning, has a section of a hole 43 in this part formed with a hexagonal shape, for example, adapted to the main shaft 3, as shown in FIG. 2 and FIG. 3.

Furthermore, the cam grooves 41*a* and 41*b* formed on the outer circumferential face of the cam 4 are formed in an annular spiral shape, for example, so that the cam 4 may slide in the axial direction without turning against the main shaft 3 with an action of the pins 81 and 82, provided in projection on the inner circumferential face of the cylinder portion 22 of the inner casing 2 of the cylinder C and fit in the cam grooves 41*a*, 41*b*, when the cylinder C is driven to turn by the drive shaft 23 connected to a driving source.

By the way, while two cam grooves 41*a* and 41*b* are formed in this embodiment, the number of cam grooves is not limited to two, but may be one, or a plural number of three or more.

In the case where a plurality of cam grooves 41*a* and 41*b* are formed, as in this embodiment, the pins 81 and 82, provided in projection on the inner circumferential face of the cylinder portion 22 of the inner casing 2 of the cylinder C will be provided in projection at uniform angle intervals (180° in this embodiment).

As described above, by providing a plurality of cam grooves 41*a* and 41*b* and pins 81 and 82, it becomes possible to smoothly transmit a large rotational driving force from the cylinder C to the cam 4 through the pins 81 and 82, and stably produce an impulse torque on the main shaft 3 on which is fit the cam 4.

Further, the oil guide holes 42*a* and 42*b* passing in the axial direction inside the cam 4 are composed of two through holes in this embodiment, though not particularly limited to this construction, so that it may have a sufficient capacity for enabling smooth circulation of operating fluid between the oil chambers A and B, formed across the cam 4, when the cam 4 slides in the axial direction without turning relative to the main shaft 3.

The check valve 5 shuts off the circulation of operating fluid between the oil chambers A and B formed across the cam 4 by selectively closing the oil guide holes 42*a* and 42*b* formed in the cam 4 depending on the relative rotating angle between the cam 4 and the cylinder C. The check valve 5 is disposed in the oil chamber A on one side so as to always be urged by the spring 6 so that it contacts with one end face of the cam 4 and turns by following the cylinder C.

Figure 4:
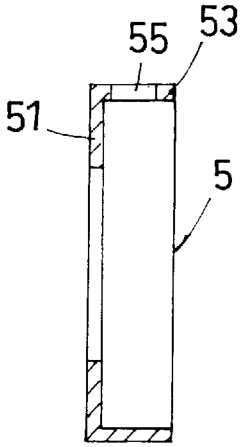
Figure 4:
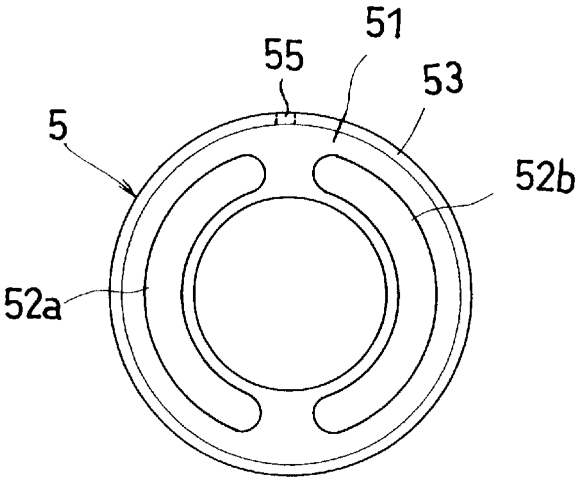

The check valve 5 is composed, as shown in FIG. 4, of a disc-shaped body 51 to be put in contact with one end face of the cam 4 and an annular portion 53 along the inner circumferential face of the cylinder portion 22 of the inner casing 2 of the cylinder C.

On the body 51 are formed curved slits 52*a* and 52*b* allowing circulation of operating fluid between the oil chambers A and B in communication with the oil guide holes 42*a* and 42*b* formed in the cam 4 It is so arranged that the portions not forming any hole between the slits 52*a* and 52*b* close the oil guide holes 42*a* and 42*b*.

The position and the number of slits 52*a* and 52*b* formed on the body 51 determine the number and the magnitude of the impulse torques produced while the cam 4 and the cylinder C relatively turn by 360°.

By forming the slits 52*a* and 52*b* at the position indicated in this embodiment, it becomes possible for the check valve 5 to close the oil guide holes 42*a* and 42*b* formed in the cam 4 and shut off the circulation of operating fluid between the oil chambers A and B formed across the cam 4 each time when the cam 4 and the cylinder C relatively turn by 360°, thus producing a large impulse torque by utilizing inertia of the cylinder C each time when the cam 4 and the cylinder C relatively turn by 360°.

Furthermore, in the cylinder portion 12 of the outer casing 1 and the cylinder portion 22 of the inner casing 2 of the cylinder C are formed oil guide channels 15 and 25 connecting between the oil chambers A and B formed across the cam 4. An output adjusting mechanism 13 is capable of adjusting the magnitude of the impulse torque produced by limiting the flow rate of the operating fluid circulating through the oil guide channels 15 and 25. This is done by screwing mechanism 13 in the end face wall 11 of the outer casing 1, for example.

Adjustment of the output adjusting mechanism 13 makes it possible to easily adjust the magnitude of the impulse torque produced by limiting the flow rate of the operating fluid circulating through the oil guide channel 25 connecting between the oil chambers A and B across the cam 4 in the cylinder C. To be concrete, by adjusting the output adjusting mechanism 13, it is possible to adjust such that, the smaller the flow rate of the operating fluid circulating through the oil guide channel 25, the larger the magnitude of the impulse torque produced, and, conversely, the larger the flow rate of the operating fluid circulating through the oil guide channel 25, the smaller the magnitude of the impulse torque produced.

Moreover, in the annular portion 53 is formed a slit 55 in which to insert a pin 54 provided in projection on the inner circumferential face of the cylinder portion 22 of the inner casing 2 of the cylinder C. This enables the check valve 5 to turn following the cylinder C and slide following the cam 4 while contacting with one end face of the cam 4.

Furthermore, on the end face wall 11 of the outer casing 1 will be disposed a plug 14, by screwing, etc., used for injecting operating fluid into the oil chambers A and B.

Furthermore, between the outer casing 1 and the inner casing 2, between the outer casing 11 of the cylinder C and the main shaft 3, and at the position of the output adjusting mechanism 13, the plug 14, etc. will be disposed sealing members 71, 72, 73 and 74 such as O rings, etc. for protection against leakage of operating fluid.

Operation of this impulse torque generator for a hydraulic torque wrench will be explained hereafter based on FIG. 5.

In the first place, the cylinder C is rotatively driven (a right turn as seen from the side of drive shaft 23) by the drive shaft 23, connected to an air motor as a drive source.

Figure 5:
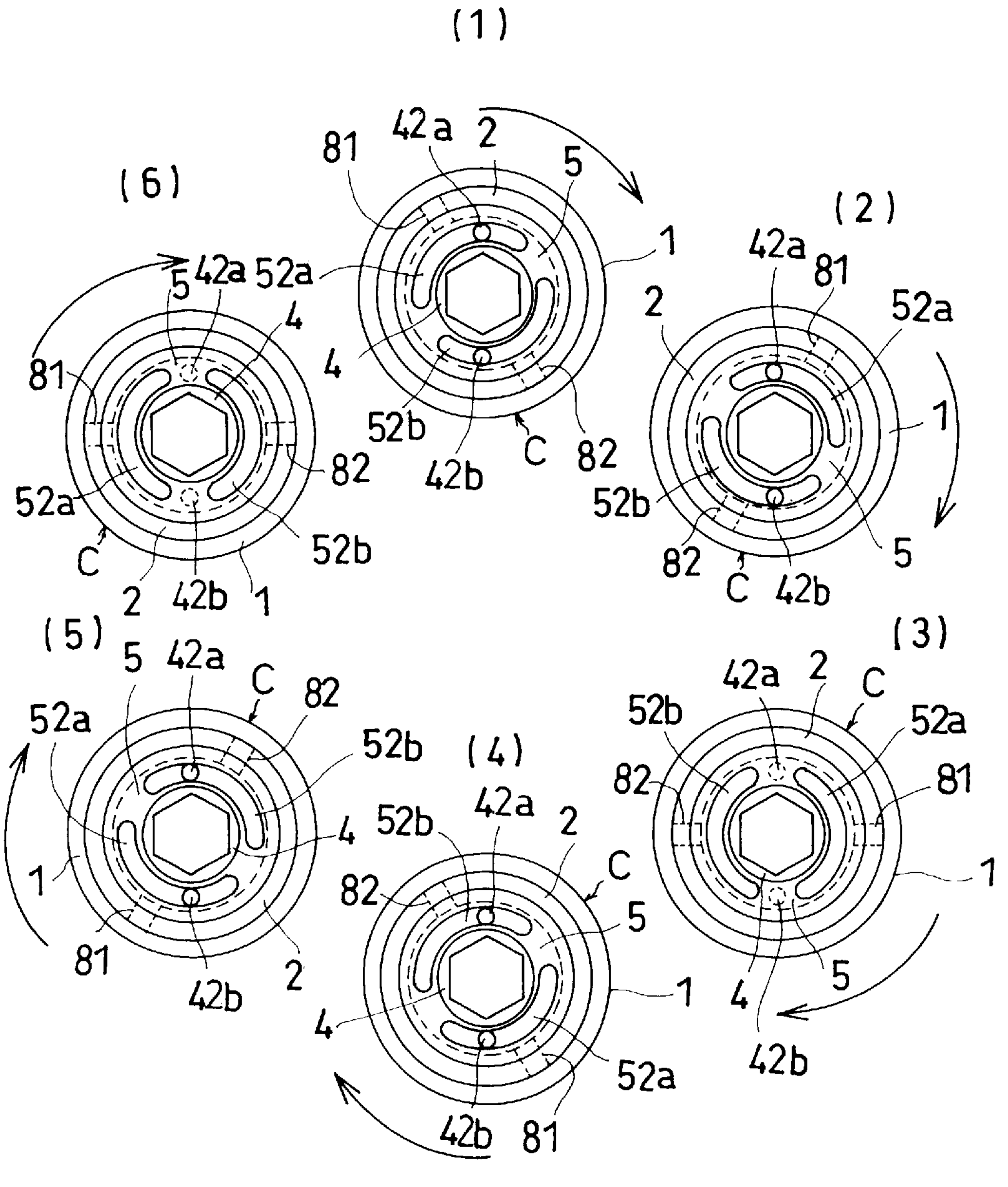
FIG. 5 is an explanatory drawing showing actions of the impulse torque generator for a hydraulic torque wrench according to the present invention.

As the cylinder C is rotatively driven, the inside of the impulse torque generator changes as in FIG. 5 (1)→(2)→(3)→(4)→(5)→(6)→(1) . . .

FIG. 5 (1) indicates a state in which no impulse torque is produced on the main shaft 3. The state where the cylinder C and the cam 4 relatively turn by 60° in order is indicated in FIG. 5 (2), (3) (a state in which an impulse torque is produced on the main shaft 3), (4), (5), (6).

Firstly, in the state in which the oil guide holes 42*a* and 42*b* formed on the cam 4 and the slits 52*a* and 52*b* formed on the check valve 5 are in communication with each other, as shown in FIG. 5 (1), circulation of operating fluid between the oil chambers A and B is allowed, and this makes it possible to slide the cam 4, in which are fit the pins 81 and 82 provided in projection on the inner circumferential face of the cylinder C, freely in the axial direction without turning against the main shaft 3 (the cam 4 slides from right to left, as seen from the front face (in FIG. 1), and the operating fluid flows from oil chamber B to oil chamber A). In this state, no impulse torque is produced because there is no restriction on the cylinder C and the cam 4.

If, from this state, the cylinder C is further rotatively driven, a change of state takes place, through the state in which the oil guide holes 42*a* and 42*b* and the slits 52*a* and 52*b* are in communication with each other, as shown in FIG. 5 (2), (the same state as that in FIG. 5 (1) without production of impulse torque, although the cam 4 slides from right to left, as seen from the front face (in FIG. 1), and the operating fluid flows from oil chamber A to oil chamber B), to a state in which the oil guide holes 42*a* and 42*b* and the slits 52*a* and 52*b* are not in communication with each other as shown in FIG. 5 (3).

In the state indicated in this FIG. 5 (3), since the cam 4 slides from left to right, as seen from the front face (in FIG. 1), the pressure rises in the oil chamber A, found in the sliding direction and drops in the oil chamber B, found in the opposite direction.

And, in the case where the circulation of operating fluid from high-pressure oil chamber A to low-pressure oil chamber B is shut off and that, in this state, the cylinder C is rotatively driven to slide the cam 4 in the axial direction, the pressure further rises in the oil chamber A and becomes still lower in the oil chamber B.

At that time, the pins 81 and 82 are strongly put in contact with the side face, on the high-pressure oil chamber A side, of the cam grooves 41*a* and 41*b* and, since the sliding of the cam 4 is prevented by shutting off of the circulation of operating fluid from high-pressure oil chamber A to low-pressure oil chamber B, a large frictional force is produced between the side face of the cam grooves 41*a* and 41*b* and the pins 81 and 82, restricting the cylinder C and the cam 4.

This makes it possible to produce an impulse torque on the main shaft 3 inserted in the cam 4 by transmitting a rotational driving force from the cylinder C to the cam 4 through the pins 81 and 82.

If, from this state, the cylinder C is further rotatively driven, a change of state takes place, again, through the state in which the oil guide holes 42*a* and 42*b* and the slits 52*a* and 52*b* are in communication with each other, as shown in FIG. 5 (4) and FIG. 5 (5), (the same state as that in FIG. 5 (1) without production of impulse torque, although, in FIG. 5 (4), the cam 4 slides from left to right, as seen from the front face (in FIG. 1), and the operating fluid flows from oil chamber A to oil chamber B, while in FIG. 5 (5) the cam 4 slides from right to left, as seen from the front face (in FIG. 1) and the operating fluid flows from oil chamber B to oil chamber A), to a state in which the oil guide holes 42*a* and 42*b* and the slits 52*a* , 52*b* are not in communication with each other as shown in FIG. 5 (6).

In the state indicated in this FIG. 5 (6), since the cam 4 slides from right to left, as seen from the front face (in FIG. 1), the pressure rises in the oil chamber B found in the sliding direction and drops in the oil chamber A found in the opposite direction However, unlike the case of the state indicated in FIG. 5 (3), when the pressure in the oil chamber B gets high, the hydraulic pressure of the operating fluid in the oil chamber B acts on the check valve 5 through the oil guide holes 42*a* and 42*b* formed on the cam 4, and makes the check valve 5, which was in contact with one end face of the cam 4, retreat against the urging force of the spring 6 to allow flow of the operating fluid from the high-pressure oil chamber B to the low-pressure oil chamber A. This makes it possible for the cam 4, on which are fit the pins 81 and 82 provided in projection on the inner circumferential face of the cylinder C, to slide freely in the axial direction without turning against the main shaft 3, and no impulse torque is produced because there is no restriction on the cylinder C and the cam 4.

If, from this state, the cylinder C is further rotatively driven, a change of state takes place, again, to the state in which the oil guide holes 42*a* and 42*b* and the slits 52*a* , 52*b* are in communication with each other, as shown in FIG. 5 (1) (a state without production of impulse torque).

As described above, according to the impulse torque generator for a hydraulic torque wrench, it becomes possible for the check valve 5 to close the oil guide holes 42*a* and 42*b* and shut off the circulation of operating fluid between the oil chambers A and B each time when, substantially, the cam 4 and the cylinder C relatively turn by 360°, thus producing a large impulse torque by utilizing inertia of the cylinder C, each time when, substantially, the cam 4 and the cylinder C relatively turn by 360°.

In the case where the air motor which is a drive source is turned in the opposite direction (left turn as seen from drive shaft 23 side), the inside of the impulse torque generator changes as FIG. 5 (1)→(6)→(5)→(4)→(3)→(2)→(1) . . .

In this case, when the state of FIG. 5 (6) is produced, it becomes possible to produce an impulse torque in the direction opposite to the above on the main shaft 3.

The impulse torque generator for a hydraulic torque wrench according to the present invention has so far been explained based on an embodiment. However, the present invention is not limited to the construction described in the above embodiment, but may also be constructed in a way to produce impulse torque a plural number oftimes while the cam 4 and the cylinder C relatively turn by 360° by changing the position and the number of the slits 52*a* and 52*b* formed on the main body 51, for example. It may be changed in construction as required as long as it does not deviate from its purpose, such as by using an electric motor, etc. in addition to the air motor, as a drive source.

What is claimed is:

1. An impulse torque generator for a hydraulic torque wrench, comprising:

a main shaft having a base end and extending in an axial direction;

a cam that is rotatably fixed with said main shaft and axially slidable on said main shaft, said cam having operating fluid guide holes therein and said cam having at least one cam groove;

a cylinder receiving said base end of said main shaft and said cam, said cylinder forming operating fluid chambers on opposite sides of said cam and said guide holes extending between said operating fluid chambers, and said cylinder having at least one pin projecting from said cylinder into said at least one cam groove and a drive shaft to be connected to a drive source for driving said cylinder in a rotating manner; and a check valve structured and positioned to shut off circulation of operating fluid between said operating fluid chambers by selectively closing said operating fluid guide holes in dependence upon a relative rotating angle between said cam and said cylinder;

wherein said cylinder is operable to be driven in a rotating manner with said drive shaft such that said at least one pin in said at least one cam groove tends to axially slide said cam on said main shaft by rotation of said cylinder relative to said cam and, upon said check valve shutting off circulation of operating fluid between said operating fluid chambers, such that said at least one pin engages said at least one cam groove to transmit rotational driving force from said cylinder to said cam and thus to said main shaft, thereby producing an impulse torque on said main shaft.

2. The impulse torque generator of claim 1, wherein said at least one cam groove comprises a plurality of cam grooves formed on an outer face of said cam and said at least one pin comprises a plurality of pins inserted into respective said cam grooves, said plurality of pins being spaced at uniform angular intervals.

3. The impulse torque generator of claim 2, wherein said check valve is structured and positioned to shut off circulation of operating fluid between said operating fluid chambers through said operating fluid guide holes in said cam each time said cam and said cylinder relatively turn 360 degrees.

4. The impulse torque generator of claim 3, wherein said cylinder further comprises an operating fluid guide channel extending between said operating fluid chambers on opposite sides of said cam and an output adjusting mechanism in said operating fluid channel operable to adjust a magnitude of the impulse torque on said main shaft by controlling a flow rate of operating fluid through said operating fluid guide channel.

5. The impulse torque generator of claim 2, wherein said cylinder further comprises an operating fluid guide channel extending between said operating fluid chambers on opposite sides of said cam and an output adjusting mechanism in said operating fluid channel operable to adjust a magnitude of the impulse torque on said main shaft by controlling a flow rate of operating fluid through said operating fluid guide channel.

6. The impulse torque generator of claim 1, wherein said check valve is structured and positioned to shut off circulation of operating fluid between said operating fluid chambers through said operating fluid guide holes in said cam each time said cam and said cylinder relatively turn 360 degrees.

7. The impulse torque generator of claim 6, wherein said cylinder further comprises an operating fluid guide channel extending between said operating fluid chambers on opposite sides of said cam and an output adjusting mechanism in said operating fluid channel operable to adjust a magnitude of the impulse torque on said main shaft by controlling a flow rate of operating fluid through said operating fluid guide channel.

8. The impulse torque generator of claim 1, wherein said cylinder further comprises an operating fluid guide channel extending between said operating fluid chambers on opposite sides of said cam and an output adjusting mechanism in said operating fluid channel operable to adjust a magnitude of the impulse torque on said main shaft by controlling a flow rate of operating fluid through said operating fluid guide channel.

9. An impulse torque generator for a hydraulic torque wrench, comprising:

a main shaft having a base end and extending in an axial direction;

a cam that is rotatable with said main shaft and axially slidable on said main shaft, said cam having operating fluid guide holes extending axially therein between opposite sides thereof and said cam having at least one annular cam groove thereon;

a cylinder receiving said base end of said main shaft and said cam, said cylinder forming operating fluid chambers on said opposite sides of said cam and said operating fluid guide holes extending between said operating fluid chambers, and said cylinder having at least one pin projecting from said cylinder into said at least one cam groove and a drive shaft to be connected to a drive source for driving said cylinder in a rotating manner, said cam groove being shaped such that rotation of said cylinder relative to said cam causes said pin to tend to move said cam in the axial direction; and a check valve structured and positioned to shut off circulation of operating fluid between said operating fluid chambers by selectively closing said operating fluid guide holes of said cam in dependence upon a relative rotating angle between said cam and said cylinder;

wherein said cylinder is operable to be driven in a rotating manner with said drive shaft such that said at least one pin in said at least one cam groove tends to axially slide said cam on said main shaft by rotation of said cylinder relative to said cam and, upon said check valve shutting off circulation of operating fluid between said operating fluid chambers, such that said at least one pin engages said at least one cam groove to transmit rotational driving force from said cylinder to said cam and thus to said main shaft, thereby producing an impulse torque on said main shaft.

* * * * *